United States Patent
Mase

(10) Patent No.: US 8,479,707 B2
(45) Date of Patent: Jul. 9, 2013

(54) ROTATION ANGLE DETECTION DEVICE AND THROTTLE VALVE CONTROL DEVICE USING THE SAME

(75) Inventor: Makoto Mase, Handa (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 245 days.

(21) Appl. No.: 12/940,334

(22) Filed: Nov. 5, 2010

(65) Prior Publication Data
US 2011/0114061 A1 May 19, 2011

(30) Foreign Application Priority Data
Nov. 16, 2009 (JP) ................. 2009-260884

(51) Int. Cl.
*F02D 11/10* (2006.01)
*G01B 7/30* (2006.01)

(52) U.S. Cl.
USPC ............. 123/399; 324/207.25; 324/207.2; 324/207.21; 73/114.36

(58) Field of Classification Search
USPC ............ 73/114.36; 702/150, 151; 123/346, 123/399, 400, 403, 350, 361, 617
See application file for complete search history.

(56) References Cited

U.S. PATENT DOCUMENTS

| | | | |
|---|---|---|---|
| 4,773,633 A * | 9/1988 | Hinz et al. | 267/148 |
| 6,932,382 B2 * | 8/2005 | Hayes et al. | 280/735 |
| 7,032,569 B2 | 4/2006 | Ikeda et al. | |
| 7,042,212 B2 * | 5/2006 | Yoshikawa et al. | 324/207.25 |
| 7,210,451 B2 | 5/2007 | Ikeda et al. | |
| 7,216,625 B2 | 5/2007 | Ikeda et al. | |
| 7,273,034 B2 * | 9/2007 | Arai et al. | 123/400 |
| 7,389,765 B2 | 6/2008 | Ikeda | |
| 2006/0045406 A1 * | 3/2006 | Iwamoto et al. | 384/910 |
| 2007/0247143 A1 * | 10/2007 | Ikeda et al. | 324/207.25 |
| 2008/0012555 A1 * | 1/2008 | Ikeda | 324/207.25 |
| 2008/0121831 A1 * | 5/2008 | Ikeda | 324/207.25 |

FOREIGN PATENT DOCUMENTS

| | | |
|---|---|---|
| JP | 05157506 | 6/1993 |
| JP | 2007092608 | 4/2007 |
| JP | 2008008754 | 1/2008 |
| JP | 2008145258 | 6/2008 |

\* cited by examiner

*Primary Examiner* — Stephen K Cronin
*Assistant Examiner* — Elizabeth Hadley
(74) *Attorney, Agent, or Firm* — Ladas & Parry, LLP

(57) ABSTRACT

A rotation angle detection device may include a rotational member, at least one magneto-electric transducer having a magnetism detection portion capable of detecting a change in magnetism caused by rotation of the rotational member and generating a detection signal representative of the change in magnetism, and an operation voltage output portion capable of performing an operation based on the detection signal and generating an output signal. The rotation angle detection device may further include a fixed member having an receiving recess that receives the at least one magneto-electric transducer therein, and an elastic member attached to the receiving recess in which the at least one magneto-electric transducer is received.

12 Claims, 15 Drawing Sheets

ROTATION ANGLE DETECTION DEVICE AND THROTTLE VALVE CONTROL DEVICE USING THE SAME

This application claims priority to Japanese patent application serial number 2009-260884, the contents of which are incorporated herein by reference.

BACKGROUND OF THE INVENTION

1. Field of the Invention

The present invention relates to a rotation angle detection device and a throttle valve control device using the same. More particularly, the present invention relates to a throttle valve rotation angle detection device of an internal combustion engine, and a throttle valve control device using the same.

2. Description of Related Art

A throttle position sensor (a throttle valve rotation angle detection device) of an internal combustion engine is taught, for example, by Japanese Laid-Open Patent Publication No. 2007-92608.

The throttle position sensor includes a sensor circuitry (a magneto-electric transducer) that is constructed of a sensor (a magnetism detection portion) and a signal processing IC (an operation voltage output portion) that are disposed in an L-shape. The sensor circuitry is molded by insert molding of resin to form a magnetic field detector assembly. The magnetic field detector assembly is integrally provided with a cover (a fixture member) by insert molding of resin.

In the conventional throttle position sensor thus constructed, two separate insert molding processes (an insert molding process for forming the magnetic field detector assembly and an additional insert molding process for proving the cover to the magnetic field detector assembly) must be performed. This may lead to increased manufacturing steps and increased manufacturing costs. In addition, a molding pressure and a molding heat can be applied to the sensor circuitry during the insert molding processes. The molding pressure and the molding heat may lead to decreased detection performance or failure of the sensor circuitry.

BRIEF SUMMARY OF THE INVENTION

For example, in one embodiment of the present invention, a rotation angle detection device may include a rotational member, at least one magneto-electric transducer having a magnetism detection portion capable of detecting a change in magnetism caused by rotation of the rotational member and generating a detection signal representative of the change in magnetism, and an operation voltage output portion capable of performing an operation based on the detection signal from the magnetism detection portion and generating an output signal representative of the change in magnetism. The rotation angle detection device may further include a fixed member having an receiving recess that receives the at least one magneto-electric transducer therein, and an elastic member attached to the receiving recess in which the at least one magneto-electric transducer is received. The elastic member is capable of elastically pressing the magnetism detection portion against a bottom surface of the receiving recess and elastically pressing the operation voltage output portion against one of opposite wall surfaces of the receiving recess.

According to the rotation angle detection device, the magnetism detection portion of the at least one magneto-electric transducer can be elastically pressed against the bottom surface of the receiving recess by the elastic member. In addition, the operation voltage output portion of the at least one magneto-electric transducer can be elastically pressed against one of the opposite wall surfaces of the receiving recess by the elastic member. Thus, the at least one magneto-electric transducer can be attached to the fixed member without performing insert molding. Therefore, the at least one magneto-electric transducer can be prevented from being adversely affected when it is attached to the fixed member.

Further, the at least one magneto-electric transducer can include two magneto-electric transducers. In this case, the two magneto-electric transducers are oppositely disposed in the receiving recess of the fixed member while the magnetism detection portions are positioned in a stack. Further, the magnetism detection portions of the magneto-electric transducers can be elastically pressed against the bottom surface of the receiving recess by the elastic member. In addition, the operation voltage output portions of the magneto-electric transducers can respectively be elastically pressed against the opposite wall surfaces of the receiving recess by the elastic member.

Further, the rotation angle detection device can further include a cap that is fitted into an opening portion of the receiving recess of the fixed member. Optionally, the cap is integrally connected to the elastic member.

Other objects, features, and advantages, of the present invention will be readily understood after reading the following detailed description together with the accompanying drawings and the claims.

DETAILED DESCRIPTION OF THE INVENTION

Representative embodiments of the present invention will now be described with reference to the drawings.

First Embodiment

A first embodiment of the present invention will be described with reference to FIGS. 1 to 17.

The present embodiment is directed to a rotation angle detection device that is used in an electronically-controlled throttle valve control device (which will be hereinafter simply referred to as a throttle valve control device) of a vehicle, e.g., an automobile. The rotation angle detection device may function as a throttle position sensor that is capable of detecting a rotation angle or degree of open of a throttle valve of an internal combustion engine of the vehicle.

First, the throttle valve control device 10 is described. Further, with regard to the throttle valve control device 10, forward and rearward, rightward and leftward, and upward and downward of the throttle valve control device respectively correspond to forward and rearward, rightward and leftward, and upward and downward in FIG. 1.

Figure 1:
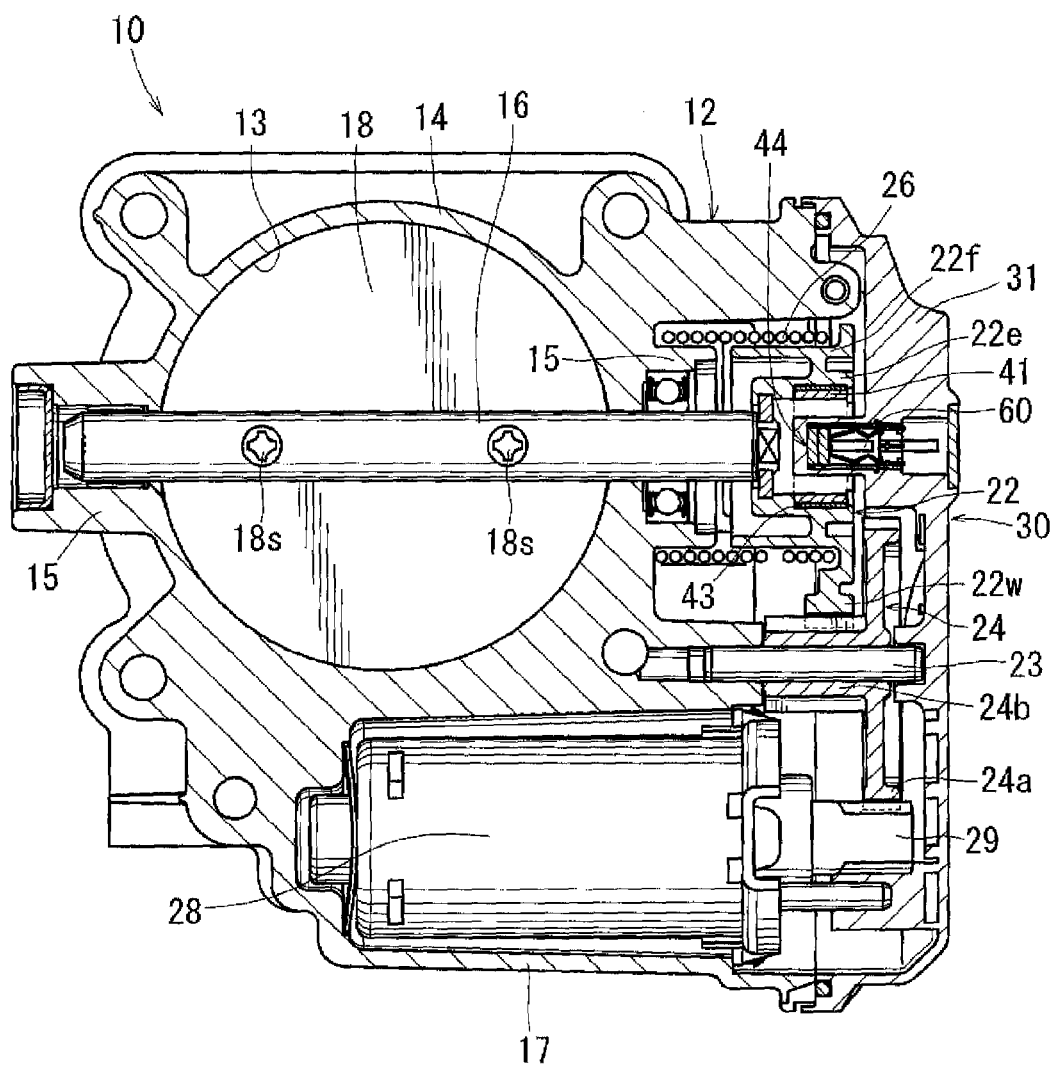
FIG. 1 is a sectional view of a throttle valve control device according to a first representative embodiment of the present invention.

As shown in FIG. 1, the throttle valve control device 10 includes a throttle body 12, a throttle valve 18, a back spring 26 and a drive motor 28. The throttle valve control device 10 further includes a gear reducer (a power transmission device) that is composed of a throttle gear 22, a counter gear 24 and a pinion gear 29. The throttle body 12 may preferably be made of aluminum alloy or resin. The throttle body 12 integrally has a cylindrical bore wall 14 and a motor housing portion 17. The cylindrical bore wall 14 is formed to extend forward and rearward and defines a cylindrical air intake passage (bore) 13 therein. The cylindrical bore wall 14 has an upstream end and a downstream end that are respectively connected to an air cleaner (not shown) and an intake manifold (not shown).

The throttle valve 18 is constructed of a disk-shaped butterfly valve. The throttle valve 18 is connected to a metallic throttle shaft 16 via screws 18s and is received in the air intake passage 13 of the throttle body 12, so as to close and open the air intake passage 13. The throttle shaft 16 is rotatably attached to the throttle body 12 while diametrically (rightwardly and leftwardly) crossing the air intake passage 13. In particular, the throttle shaft 16 is rotatably supported via a pair of bearing portions 15 that are positioned right and left sides of the cylindrical bore wall 14. The throttle valve 18 is capable of closing and opening the air intake passage 13 when integrally rotated with the throttle shaft 16.

A right end portion of the throttle shaft 16 extends through the right bearing portion 15. The throttle gear 22 is coaxially and unrotatably attached to the right end portion of the throttle shaft 16. The throttle gear 22 may preferably be made of resin. The throttle gear 22 is bicylindrically shaped to have an inner cylindrical portion 22e and an outer cylindrical portion 22f. The outer cylindrical portion 22f has a sector gear portion 22w that is formed in a circumferential portion thereof.

The back spring 26 is disposed between the right side of the cylindrical bore wall 14 of the throttle body 12 and the throttle gear 22. The back spring 26 is constructed of a coil spring. The back spring 26 is arranged and constructed to normally bias the throttle gear 22 in a valve closing direction. Further, the back spring 26 is fitted over the right bearing portion 15 and the outer cylindrical portion 22f of the throttle gear 22 and is supported from inside thereby.

The motor housing 17 of the throttle body 12 has a bottomed cylindrical shape that is rightwardly opened. The motor housing 17 is positioned to be parallel to the throttle shaft 16. The drive motor 28 is received in the motor housing 17. The drive motor 28 may preferably be constructed of a DC motor. The drive motor 28 is electrically connected to an engine control unit (ECU) (not shown), so as to be controllably actuated or driven in response to a depressing amount of an accelerator pedal (not shown) of the vehicle. Upon actuation of the drive motor 28, an output shaft thereof (not shown) can be rotated.

The output shaft of the drive motor 28 has a rightwardly projected portion to which the pinion gear 29 is connected. Further, the throttle body 12 is provided with a counter shaft 23 that is projected rightwardly therefrom in parallel with the throttle shaft 16. The counter gear 24 is rotatably attached to the counter shaft 23. The counter gear 24 has two gear portions 24a and 24b respectively having gear diameters that are different from each other. The large diameter portion 24a is meshed with the pinion gear 29. Conversely, the small diameter portion 24b is meshed with the throttle gear 22 (the sector gear portion 22w of the outer cylindrical portion 22o. Thus, a rotative force of the drive motor 28 can be transmitted to the throttle shaft 16 via the pinion gear 29, the counter gear 24 and the throttle gear 22, so as to rotate the throttle shaft 16. As a result, the throttle valve 18 can be rotated within the air intake passage 13, so as to control intake airflow in the air intake passage 13.

Figure 2:
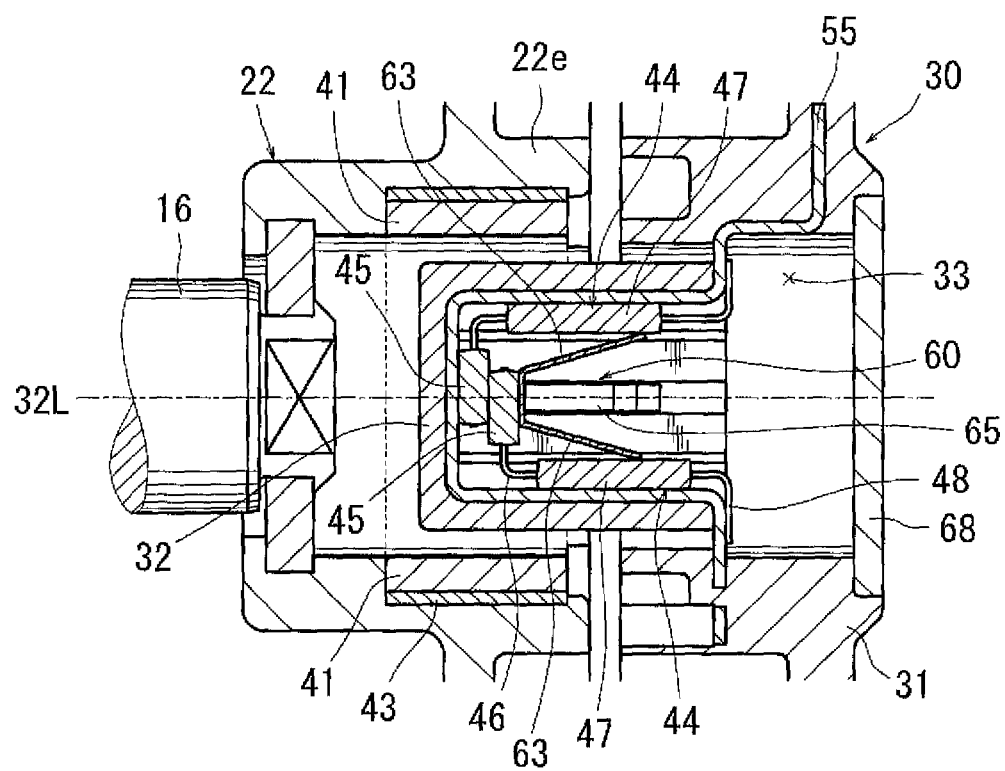
FIG. 2 is a sectional view of a rotation angle detection device.
Figure 3:
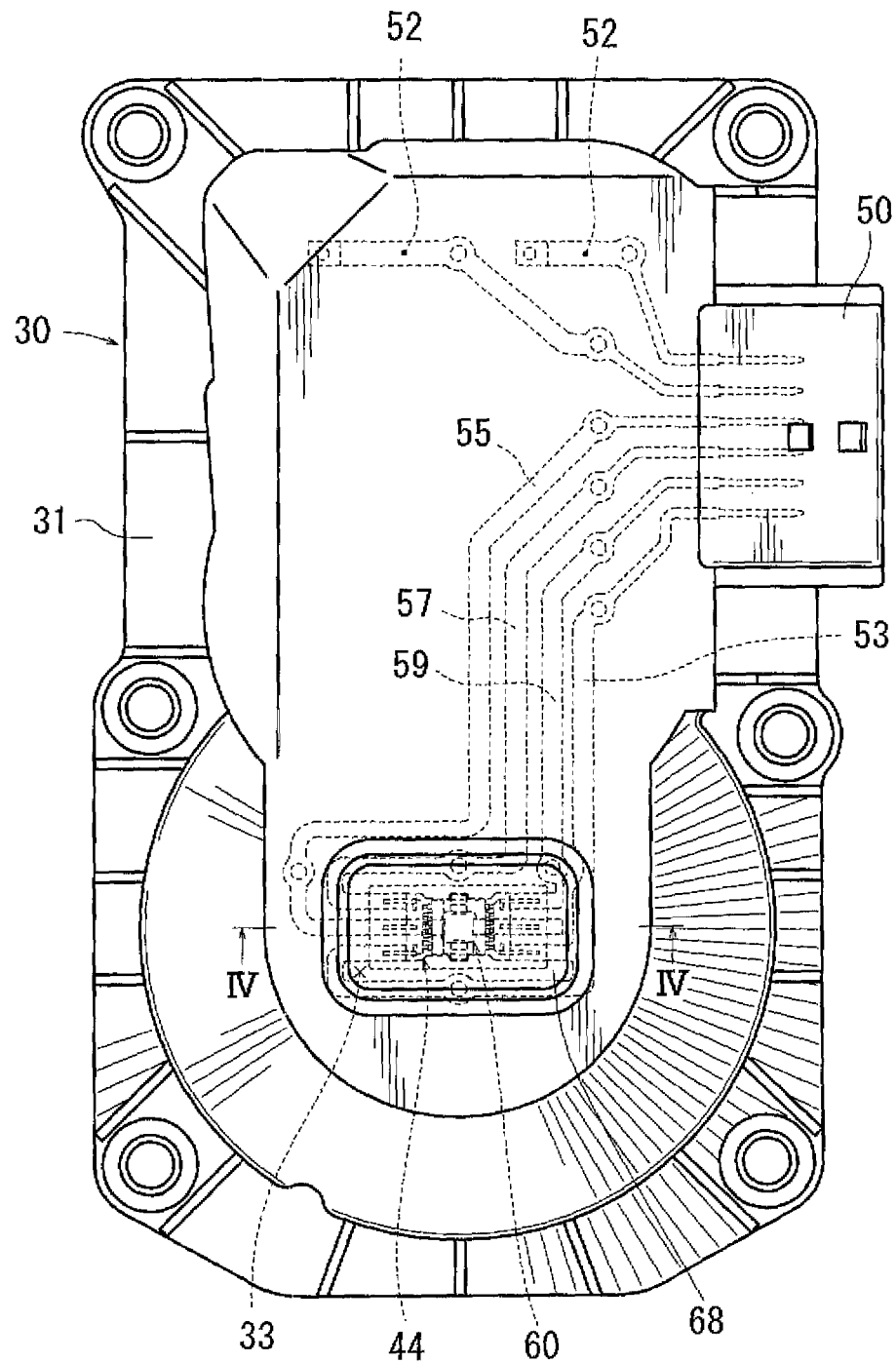
FIG. 3 is a plan view of a sensor cover.

As best shown in FIG. 2, the throttle gear 22 is integrally provided with a cylindrical yoke 43 that is attached to an inner circumferential surface of the inner cylindrical portion 22e, and a pair of permanent magnets 41 that are received within the yoke 43. The permanent magnets 41 are respectively constructed of ferrite magnets and are magnetized so as to produce substantially parallel magnetic fields therebetween. Further, the yoke 43 is made of magnetic materials and is embedded in the inner cylindrical portion 22e.

As shown in FIG. 1, the throttle body 12 is provided with a cover 30 (which will be hereinafter referred to as a sensor cover) that is capable of covering the gear reducer (the throttle gear 22, the counter gear 24 and the pinion gear 29) and other components. Further, with regard to the sensor cover 30, an outer surface side (a right surface side in FIG. 1) and an inner surface side (a left surface side in FIG. 1) are respectively referred to as an upper surface side and a lower surface side. Also, a portion (an upper portion in FIG. 1) corresponding to the throttle gear 22 and a portion (a lower portion in FIG. 1) corresponding to the drive motor 28 are respectively referred to as a front portion and a back portion.

Figure 4:
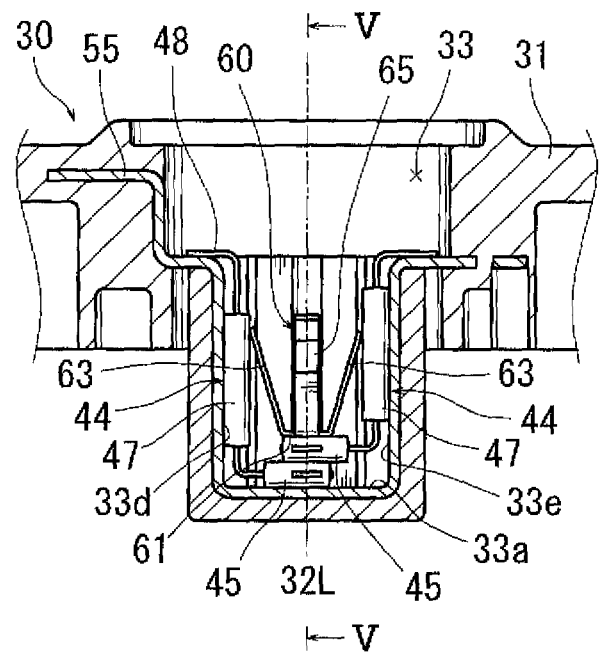
FIG. 4 is a sectional view taken along line IV-IV of FIG. 3.

As shown in FIG. 4, the sensor cover 30 may preferably include a cover body 31, two magneto-electric transducers 44 that are capable of detecting a rotation angle of a throttle gear 22 (FIG. 1) or degree of open of the throttle valve 18, and an elastic member 60 (FIG. 6) that is capable of elastically attaching the magneto-electric transducers 44 to the cover body 31.

First, the cover body 31 will be described. As shown in FIG. 7, the cover body 31 may preferably be made of resin, e.g., polybutylene terephthalate (PBT). The cover body 31 is a plate-shaped member having a rectangular shape that is elongated in a front-back direction (a vertical direction in FIG. 7). The cover body 31 has a connector portion 50 (FIG. 6) that is formed in a right side of a rear portion thereof. Conversely, the cover body 31 has a bottomed receptacle wall portion 32 (FIGS. 9 and 10) that is formed in a front portion thereof. The receptacle wall portion 32 has a rectangular cross-sectional shape that is elongated in a right-left (lateral) direction and shortened in the front-back direction. Further, as shown in FIG. 2, the receptacle wall portion 32 has an axis line 32L that is aligned with a rotational axis of the throttle shaft 16 (including the throttle gear 22).

Figure 8:
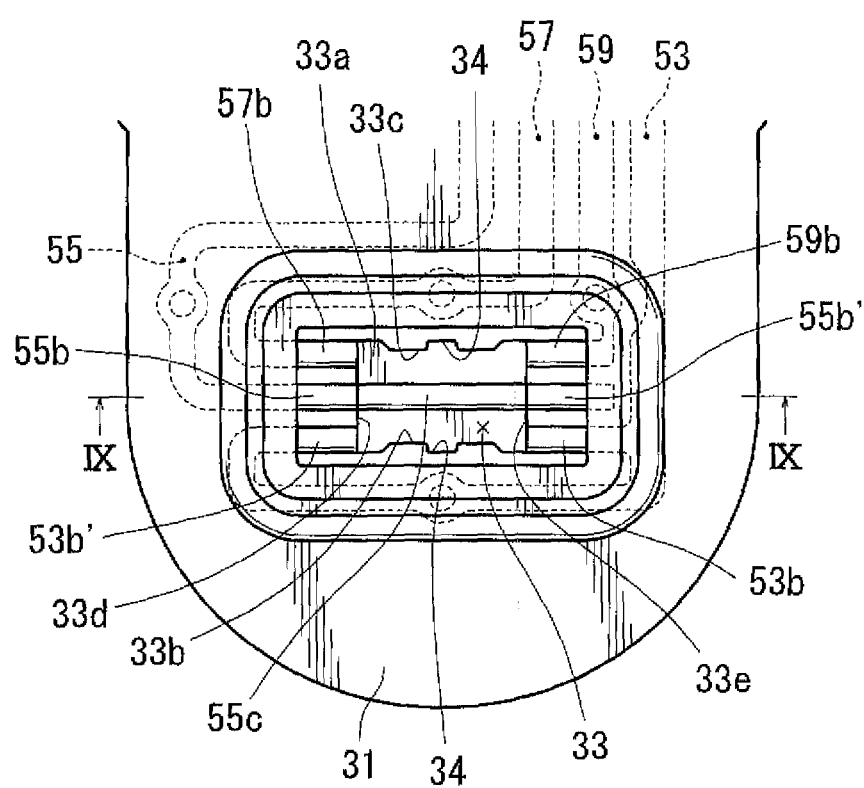
FIG. 8 is a partially plan view of the cover body.
Figure 9:
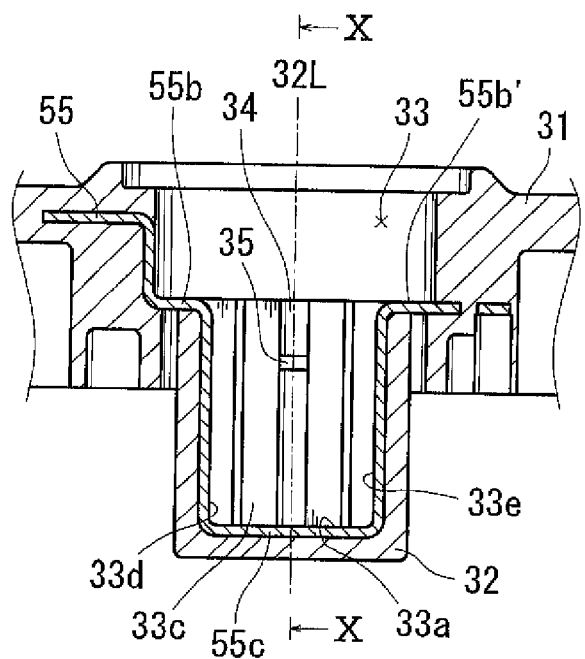
FIG. 9 is a sectional view taken along line IX-IX of FIG. 8.
Figure 10:
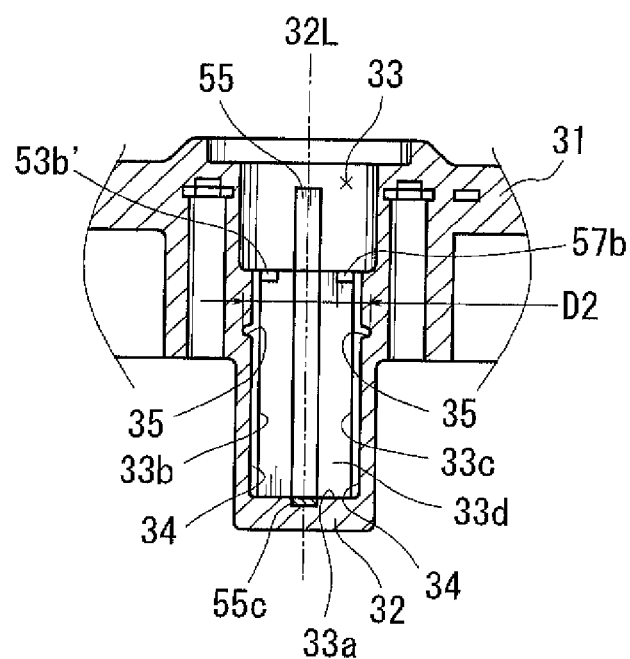
FIG. 10 is a sectional view taken along line X-X of FIG. 9.

As shown in FIGS. 9 and 10, the receptacle wall portion 32 is opened in an upper surface (an outer surface) of the cover body 31. Further, a lower half of the receptacle wall portion 32 is projected from a lower surface (an inner surface) of the cover body 31. The receptacle wall portion 32 defines a double shouldered receiving recess 33 therein. The receiving recess 33 has an upper widened recess portion (an opening portion), a middle recess portion and a lower narrowed recess portion. As shown in FIGS. 8 and 9, a pair of vertically extending linear guide grooves 34 are respectively formed in opposite elongated wall surfaces 33b and 33c (i.e., a front wall surface 33b and a rear wall surface 33c) of the lower narrowed recess portion of the receiving recess 33. Each of the guide grooves 34 may preferably be positioned in a laterally central portion of each of the elongated wall surfaces 33b and 33c. As shown in FIGS. 9 and 10, each of the guide grooves 34 has an engagement notch 35 that is formed in an upper portion thereof. Further, the engagement notch 35 is formed in a bottom surface of the guide groove 34 so as to extend in a widthwise direction of the guide groove 34.

As shown in FIG. 7, the cover body 31 is provided with a pair of motor terminals 52, four sensor terminals 53, 55, 57 and 59, a plurality of (six in this embodiment) collars 56 that are respectively embedded therein. The motor terminals 52, the sensor terminals 53, 55, 57 and 59, and the collars 56 may preferably be embedded in the cover body 31 by insert molding. Further, the sensor terminals 53 and 55 can respectively used as a power source sensor terminal and a grounded sensor terminal. Conversely, each of the sensor terminals 57 and 59 can respectively used as a signal output terminal.

As shown in FIGS. 7 and 8, the sensor terminal 53 has a pair of branched terminal portions 53b and 53b' that are formed in one end (a proximal end) thereof. The terminal portions 53b and 53b' are laterally oppositely positioned and embedded in a shouldered portion between the middle recess portion and the lower narrowed recess portion of the receiving recess 33.

As shown in FIGS. 7 to 9, the sensor terminal 55 has a pair of terminal portions 55b and 55b' that are formed in one end (a proximal end) thereof. Similar to the terminal portions 53b and 53b', the terminal portions 55b and 55b' are laterally oppositely positioned and embedded in the shouldered portion between the middle recess portion and the lower narrowed recess portion of the receiving recess 33. However, unlike the terminal portions 53b and 53b', the terminal portions 55b and 55b' are electrically connected to each other via a connecting portion 55c that is disposed along opposite wall surfaces (i.e., a left wall surface 33d and a right wall surface 33e) and a bottom surface 33a of the lower narrowed recess portion of the receiving recess 33. Further, as shown in FIG. 9, the connecting portion 55c may preferably be embedded in the receptacle wall portion 32 such that an exposed surface thereof is flush with the wall surfaces 33d and 33e and the bottom surface 33a.

Further, as shown in FIGS. 7 and 8, the sensor terminal 57 has a terminal portion 57b that is formed in one end (a proximal end) thereof. Similarly, the sensor terminal 59 has a terminal portion 59b that is formed in one end (a proximal end) thereof. The terminal portions 57b and 59b are laterally oppositely positioned and embedded in the shouldered portion between the middle recess portion and the lower narrowed recess portion of the receiving recess 33.

As shown in FIG. 7, the sensor terminals 53, 55, 57 and 59 respectively have terminal portions 53a, 55a, 57a and 59a each of which is formed in the other end (a distal end) thereof. The terminal portions 53a, 55a, 57a and 59a are disposed within the connector portion 50 of the cover body 31.

As shown in FIG. 7, each of the motor terminals 52 has a terminal portion 52b that is formed in one end (a proximal end) thereof. The terminal portions 52b of the motor terminals 52 are respectively disposed on the inner surface (the lower surface) of the cover body 31, so as to electrically contact terminals (not shown) of the drive motor 28. Conversely, each of the motor terminals 52 has a terminal portion 52a that is formed in the other end (a distal end) thereof. The terminal portions 52a of the motor terminals 52 are respectively disposed within the connector portion 50 of the cover body 31.

Each of the collars 56 is shaped to receive a fastener (e.g., a bolt, a rivet or other such devices) (not shown) that is capable of fastening the sensor cover 30 to the throttle body 12. As shown in FIG. 7, the collars 56 are disposed along both side end peripheries of the cover body 31 by threes and are separately positioned at an upper portion, a central portion and a lower portion of the cover body 31.

Next, the magneto-electric transducers 44 will be described. Further, in this embodiment, the two magneto-electric transducers 44 are provided for a fail-safe measures. Therefore, even if one of the magneto-electric transducers 44 fails, the rotation angle or the degree of open of the throttle valve 18 can be detected by the other of the magneto-electric transducers 44.

Figure 11:
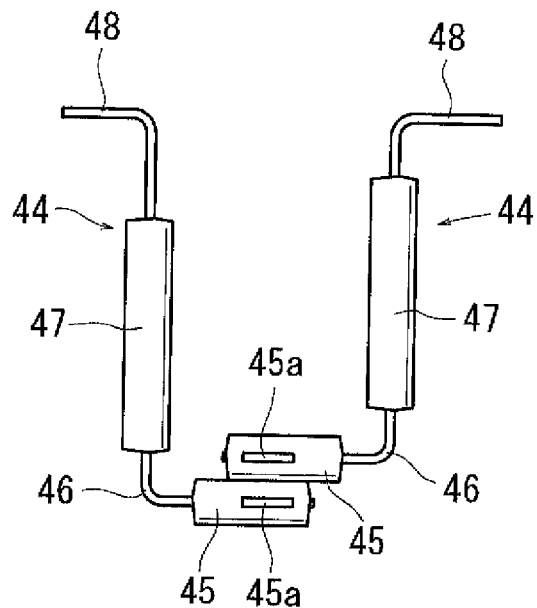
FIG. 11 is an elevational view of a magneto-electric transducer.

As shown in FIG. 11, each of the magneto-electric transducers 44 is a sensor IC having a magnetoresistive element (MR element) or other such elements. Each of the magneto-electric transducers 44 includes a magnetism detection portion 45 and an operation voltage output portion 47. The magnetism detection portion 45 is constructed of a chip of the magnetoresistive element that is embedded in a rectangular parallelepiped resin piece. The magnetism detection portion 45 has plate-shaped projections 45a that are respectively formed in central portions of longitudinally opposite surfaces (front and rear surfaces) thereof. Further, in FIG. 11, the plate-shaped projection 45a formed in the front surface of the magnetism detection portion 45 is shown. Conversely, the operation voltage output portion 47 is constructed of a semiconductor integrated circuit that is embedded in a rectangular parallelepiped resin piece. The operation voltage output portion 47 is electrically connected to the magnetism detection portion 45 via a plurality of lead wires 46 that are positioned between one of laterally opposite surfaces (right and left surfaces) of the magnetism detection portion 45 and one of longitudinally (vertically) opposite surfaces of the operation voltage output portion 47. Further, each of the lead wires 46 is bent at a right angle into an L-shape. As a result, the operation voltage output portion 47 and the magnetism detection portion 45 are positioned in an L-shape.

Figure 12:
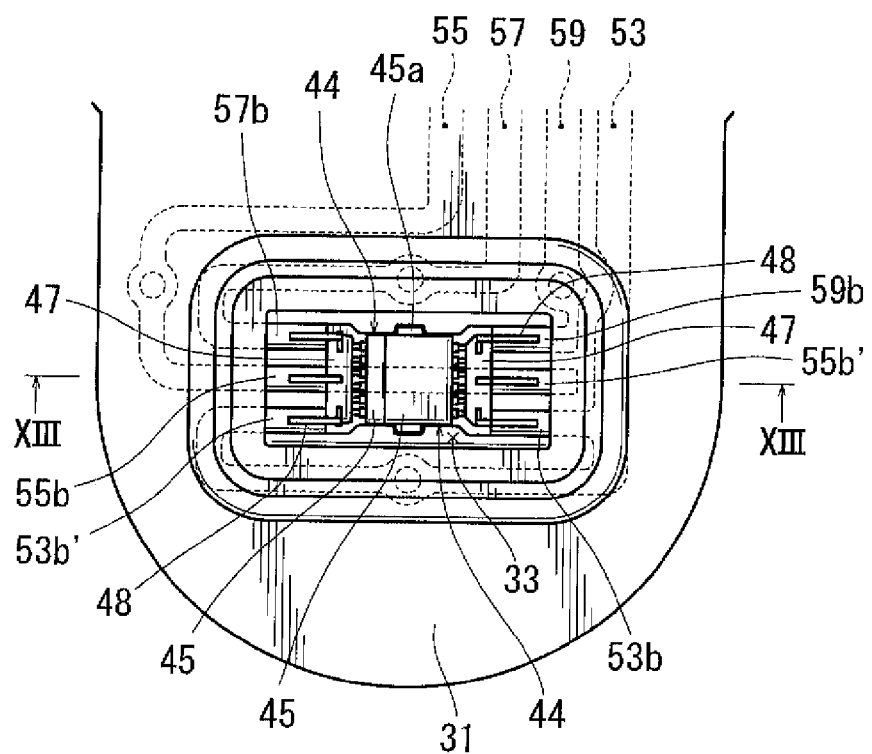
FIG. 12 is a partially plan view of the cover body to which the magneto-electric transducer is attached.

As shown in, for example, FIG. 12, a plurality of (three in this embodiment) lead wires 48 are connected to the operation voltage output portion 47. In particular, each of the lead wires 48 is connected to the other of the longitudinally (vertically) opposite surfaces of the operation voltage output portion 47 at one end (a proximal end) thereof. Further, as shown in FIG. 11, the other end (a distal end) of each of the lead wires 48 is bent into an L-shape so as to extend in a direction opposite to the magnetism detection portion 45. Further, in the description of the magneto-electric transducer 44, a side corresponding to an interior angle between the magnetism detection portion 45 and the operation voltage output portion 47 will be hereinafter referred to as an inner side. To the contrary, a side corresponding to an exterior angle between the magnetism detection portion 45 and the operation voltage output portion 47 will be hereinafter referred to as an outer side. In addition, a longitudinal direction (a vertical direction in FIG. 11) of the operation voltage output portion 47 may be referred to as a longitudinal direction of the magneto-electric transducer 44. Conversely, a widthwise or lateral direction (a front and back direction in FIG. 11) of the operation voltage output portion 47 may be referred to as a widthwise direction of magneto-electric transducers 44.

Figure 13:
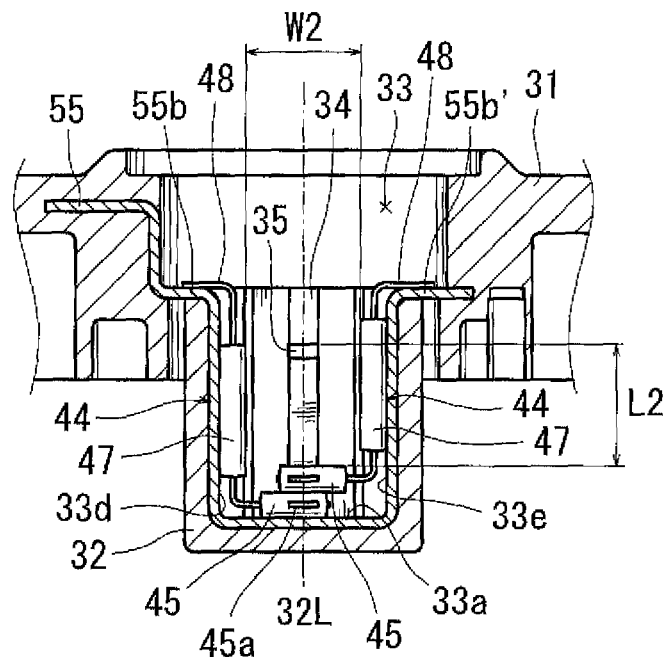
FIG. 13 is a sectional view taken along line XIII-XIII of FIG. 12.

Both of the magneto-electric transducers 44 thus constructed are oppositely disposed in the receiving recess 33 (FIGS. 8 to 10) of the cover body 31. In particular, as shown in FIG. 13, the magneto-electric transducers 44 are disposed in the receiving recess 33 (the lower narrowed recess portion) of the cover body 31 such that the magnetism detection portions 45 are positioned on the bottom surface 33a of the receiving recess 33 while the magnetism detection portions 45 are positioned in a stack, i.e., while the magnetism detection portion 45 of the right magneto-electric transducer 44 is positioned on the magnetism detection portion 45 of the left magneto-electric transducer 44. Further, the magneto-electric transducers 44 are arranged such that the operation voltage output portions 47 are laterally oppositely positioned at a distance in parallel with each other.

When the magneto-electric transducers 44 are inserted into the receiving recess 33 (the lower narrowed recess portion) of the cover body 31, both of the projections 45a formed in each of the magnetism detection portions 45 respectively engage the guide grooves 34 formed in the receiving recess 33. As a result, the projections 45a of the upper magnetism detection portion 45 can be vertically aligned with the projections 45a of the lower magnetism detection portion 45. Also, a detection center of each of the magnetism detection portions 45 can be aligned with the axis line 32L of the receptacle wall portion 32.

Further, the magneto-electric transducers 44 are disposed in the receiving recess 33 of the cover body 31 while outer surfaces of the operation voltage output portions 47 respectively contact the wall surfaces 33d and 33e of the receiving recess 33. Further, as shown in FIG. 12, the distal ends of the lead wires 48 of the left magneto-electric transducer 44 are respectively disposed on the terminal portions 53b', 55b and 57b of the sensor terminals 53, 55 and 57 that are embedded in the shouldered portion between the middle recess portion and the lower narrowed recess portion of the receiving recess 33. Conversely, the distal ends of the lead wires 48 of the right magneto-electric transducer 44 are respectively disposed on the terminal portions 53b, 55b' and 59b of the sensor terminals 53, 55 and 59 that are embedded in the shouldered portion between the middle recess portion and the lower narrowed recess portion of the receiving recess 33. Further, the distal ends of the lead wires 48 of the magneto-electric transducers 44 are respectively be connected to the terminal portions 53b', 55b, 57b, 53b, 55b' and 59b of the sensor terminals 53, 55, 57 and 59 by welding, soldering or other such methods.

Next, the elastic member 60 will be described.

Figure 14:
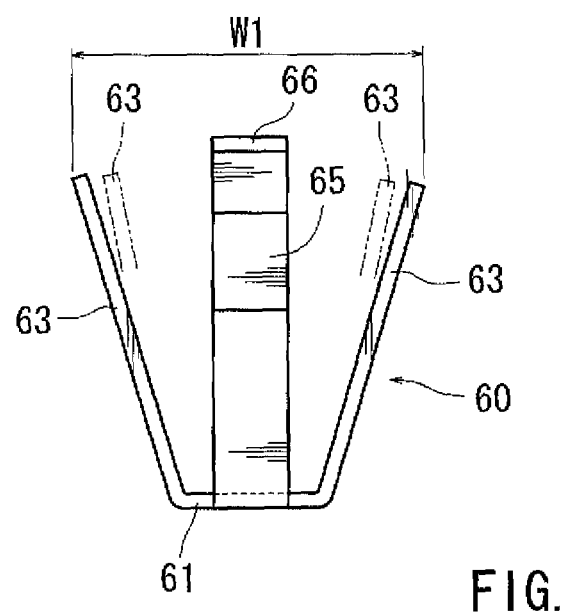
FIG. 14 is an elevational view of an elastic member.
Figure 15:
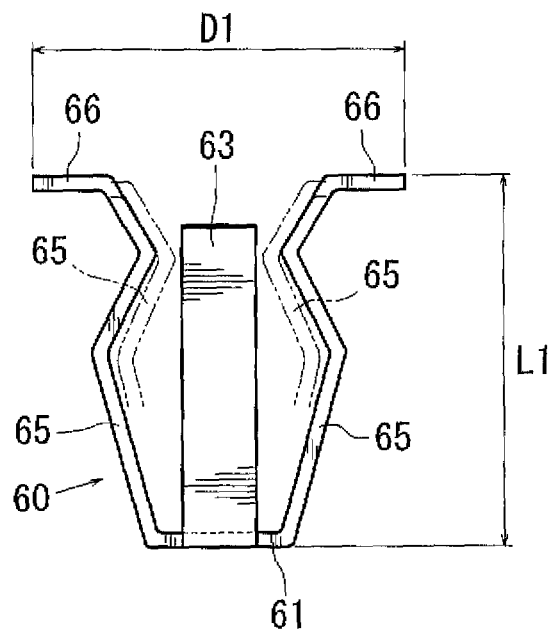
FIG. 15 is a side view of the elastic member.

As shown in FIGS. 14 and 15, the elastic member 60 may preferably be formed as a press forming product of a non-magnetic metal plate. The elastic member 60 has a cross-shaped base portion 61, a pair of first biasing strips 63 that extend upwardly from right and left end portions of the base portion 61, and a pair of second biasing strips 65 that extend upwardly from front and rear end portions of the base portion 61. As shown in FIG. 14, the first biasing strips 63 are symmetrically formed so as to be flared or widened upwardly. Conversely, as shown in FIG. 15, the second biasing strips 65 are symmetrically formed so as to be flared upwardly. However, unlike the first biasing strips 63, the second biasing strips 65 are respectively partially bent zigzag (i.e., alternately bent back and forth) in an upper half thereof. Further, the second biasing strips 65 respectively have attaching portions 66 that are formed in upper end portions thereof. The attaching portions 66 are formed by horizontally bending the upper end portions of the second biasing strips 65 in opposite directions.

As shown by broken lines in FIG. 14, the first biasing strips 63 are capable of being elastically deformed such that a distance therebetween can be reduced. Further, the first biasing strips 63 are formed such that a distance W1 (FIG. 14) between distal end portions (outer end portions) thereof in a normal condition thereof is greater than a width W2 (FIG. 13) between inner surfaces of the operation voltage output portions 47 of the magneto-electric transducers 44 that are disposed in the receiving recess 33 of the cover body 31. That is, the first biasing strips 63 are formed so as to fulfill a relation [W1>W2].

As shown by broken lines in FIG. 15, the second biasing strips 65 are capable of being elastically deformed such that a distance therebetween can be reduced while reducing heights thereof. Further, the second biasing strips 65 are formed such that a height L1 (FIG. 15) between a lower surface of the base portion 61 and an upper surface of each of the attaching portions 66 in a normal condition thereof is greater than a height L2 (FIG. 13) between an upper wall surface of the engagement notch 35 of each of the guide grooves 34 and an upper surface of the upper magnetism detection portion 45 of the magneto-electric transducers 44 that are disposed in the receiving recess 33 of the cover body 31. That is, the second biasing strips 65 are formed so as to fulfill a relation [L1>L2].

Further, the second biasing strips 65 are formed such that a width D1 (FIG. 15) between outer end portions of the attaching portions 66 in the normal condition thereof is greater than a width D2 (FIG. 10) between bottom wall surfaces of the engagement notches 35 of the guide grooves 34 formed in the receiving recess 33 of the cover body 31. That is, the second biasing strips 65 are formed so as to fulfill a relation [D1>D2].

Figure 5:
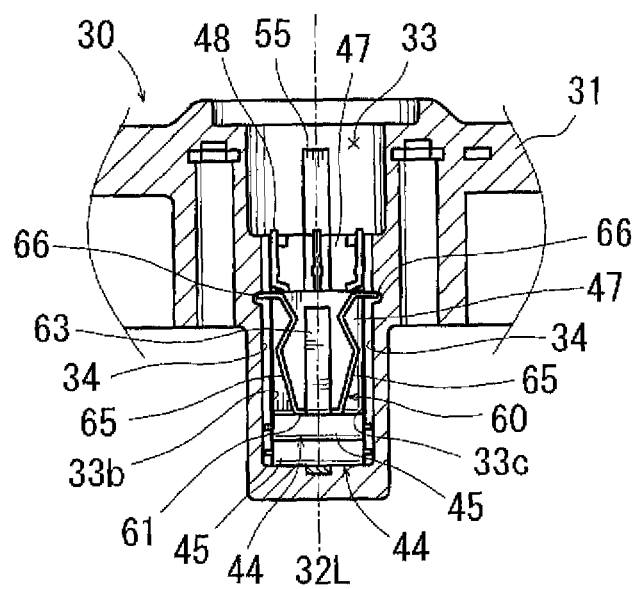
FIG. 5 is a sectional view taken along line V-V of FIG. 4.

The elastic member 60 thus constructed is attached to the receiving recess 33 (FIGS. 12 and 13) of the cover body 31 in which the magneto-electric transducers 44 are disposed. In particular, as shown in FIGS. 4 and 5, the elastic member 60 is pushed into the receiving recess 33 (the lower narrowed recess portion) of the cover body 31 until the lower surface of the base portion 61 contacts the upper surface of the upper magnetism detection portion 45. As a result, as shown in FIG. 4, the distal end portions (the outer end portions) of the first biasing strips 63 respectively elastically contact the inner surfaces of the operation voltage output portions 47. That is, as described above, the first biasing strips 63 are formed so as to fulfill a relation [W1>W2]. Therefore, each of the operation voltage output portions 47 can be applied with a biasing or pressing force in a direction (a lateral direction) perpendicular to the axis line 32L of the receptacle wall portion 32 (which may be referred to as the axis line 32L of the magnetism detection portions 45) due to an elastic force of each of the first biasing strips 63. As a result, the operation voltage output portions 47 can respectively be elastically pressed against the wall surfaces 33d and 33e of the receiving recess 33 by the elastic force of the first biasing strips 63. Thus, as shown in, for example, FIG. 4, the operation voltage output portions 47 can respectively be elastically retained on the wall surfaces 33d and 33e of the receiving recess 33 of the cover body 31.

Conversely, upon insertion of the elastic member 60 into the receiving recess 33 of the cover body 31, the outer end portions of the attaching portions 66 of the second biasing strips 65 elastically engage the guide grooves 34 formed in the receiving recess 33 and slide downwardly along bottom wall surfaces of the guide grooves 34. At this time, the elastic member 60 can be applied with a vertical elastic force of each of the second biasing strips 65. When the attaching portions 66 of the second biasing strips 65 reach the engagement notches 35 of the guide grooves 34, the outer end portions of the attaching portions 66 of the second biasing strips 65 engage the engagement notches 35 due to an elastic (restoring) force of each of the second biasing strips 65 in a back and forth direction (FIG. 5).

That is, as previously described, the second biasing strips 65 are formed so as to fulfill the relation [D1>D2]. Therefore, each of the attaching portions 66 can be applied with a biasing or pressing force in a direction (in a back and forth direction) perpendicular to the axis line 32L of the magnetism detection portions 45 due to the elastic force of each of the second biasing strips 65. As a result, the outer end portions of the attaching portions 66 of the second biasing strips 65 elastically engage the engagement notches 35 due to the elastic forces of the second biasing strips 65. Thus, the elastic member 60 can be retained in the cover body 31.

Further, when the outer end portions of the attaching portions 66 engage the engagement notches 35, the upper magnetism detection portion 45 can be pressed via the base portion 61. That is, as previously described, the second biasing strips 65 are formed so as to fulfill the relation [L1>L2]. Therefore, the magnetism detection portions 45 can be applied with a biasing or pressing force in a direction (in a vertical direction) parallel to the axis line 32L of the magnetism detection portions 45 due to the elastic force of each of the second biasing strips 65. As a result, the magnetism detection portions 45 can be elastically pressed against the bottom surface 33a of the receiving recess 33 via the base portion 61 due to the elastic forces of the second biasing strips 65. Thus, the magnetism detection portions 45 can be elastically retained on the bottom surface 33a of the receiving recess 33.

Thus, the magneto-electric transducers 44 are attached to the cover body 31, so that the sensor cover 30 can be completed (FIGS. 4 and 5). Further, a cover or cap 68 is fitted into the upper widened recess portion (the opening portion) of the receiving recess 33 formed in the cover body 31 and is secured thereto by adhesion, welding, thermal crimping or other such methods (FIG. 2). As will be appreciated, the cap 68 can effectively prevent moisture, dust or other such substances from entering the receiving recess 33. Further, the cap 68 is omitted in FIGS. 4 and 5.

As shown in FIG. 1, the sensor cover 30 thus formed is attached to a right end surface of the throttle body 12 using the fasteners. At this time, as shown in FIG. 2, a bottomed end portion (the lower half in FIGS. 4 and 5) of the receptacle wall portion 32 of the cover body 31 is concentrically loosely fitted into the inner cylindrical portion 22e of the throttle gear 22. That is, the receptacle wall portion 32 can be concentrically positioned with respect to the permanent magnets 41 and the yoke 43 of the throttle gear 22 without contacting the same. Further, the connector portion 50 (FIG. 3) of the cover body 31 is connected to an external connector (not shown) of the ECU.

Further, as shown in FIG. 2, the magnetism detection portions 45 of the magneto-electric transducers 44 can be positioned such that upper and lower surfaces (right and left surfaces in FIG. 2) thereof are perpendicular to the rotational axis of the throttle gear 22. Therefore, each of the magnetism detection portions 45 is capable of detecting a change in magnetism or a direction of magnetic field generated between the permanent magnets 41.

An detection signal (a detection result) representative of the direction of the magnetic field detected by each of the magnetism detection portions 45 is transmitted to the operation voltage output portions 47 via the lead wires 46. Each of the operation voltage output portions 47 perform an operation based on the detection signal from each of the magnetism detection portions 45 and generate an output (voltage) signal representative of the direction of the detected magnetic field. The generated output signal is transmitted to the ECU via the lead wires 48, the sensor terminals 53, 55, 57 and 59 and the external connector. The ECU calculates the rotation angle of the throttle gear 22 or the degree of open of the throttle valve 18 based on the output signal from each of the operation voltage output portions 47. Further, each of the operation voltage output portions 47 is programmed so as to generate a linear voltage signal corresponding to the rotation angle of the throttle gear 22.

The throttle gear 22 may be referred to as a rotational member. Conversely, the sensor cover 30 may be referred to as a fixed member. Further, the throttle gear 22 having the permanent magnets 41 and the yoke 43 and the sensor cover 30 constitute the rotation angle detection device.

According to the rotation angle detection device of this embodiment, each of the magneto-electric transducers 44 is constructed of the magnetism detection portion 45 and the operation voltage output portion 47 that are positioned to have the L-shape. The two magneto-electric transducers 44 thus constructed are oppositely disposed in the receiving recess 33 of the sensor cover 30 while the magnetism detection portions 45 are positioned in a stack. Further, as shown in FIGS. 4 and 5, the magnetism detection portions 45 of the magneto-electric transducers 44 can be elastically pressed against the bottom surface 33a of the receiving recess 33 by the elastic member 60. In addition, the operation voltage output portions 47 of the magneto-electric transducers 44 can respectively be elastically pressed against the left wall surface 33d and the right wall surface 33e of the receiving recess 33 by the elastic member 60. Thus, the two magneto-electric transducers 44 can be attached to the cover body 31 of the sensor cover 30 without performing insert molding. Therefore, the magneto-electric transducers 44 (the magnetism detection portions 45 and the operation voltage output portions 47) can be prevented from being adversely affected when the magneto-electric transducers 44 are attached to the cover body 31.

Further, the elastic member 60 can be elastically retained in the receiving recess 33 formed in the sensor cover 30. That is, the attaching portions 66 of the second biasing strips 65 of the elastic member 60 engage the engagement notches 35 of the guide grooves 34 formed in the receiving recess 33 due to the elastic force of each of the second biasing strips 65, so that the elastic member 60 can be retained in the receiving recess 33. Thus, the elastic member 60 can be retained in the receiving recess 33 without using a special retainer members.

Further, the receiving recess 33 of the receptacle wall portion 32 of the cover body 31 can be formed by resin molding using a single molding die. Therefore, the receiving recess 33 can be precisely formed. That is, a shape of each of the bottom surface 33a and the wall surfaces 33b, 33c, 33d and 33e of the receiving recess 33 can be precisely formed. Also, an angle (a right angle) of the bottom surface 33a and the wall surfaces 33b, 33c, 33d and 33e of the receiving recess 33 relative to each other can be precisely formed. As a result, the magneto-electric transducers 44 can be precisely disposed in the receiving recess 33.

Figure 16:
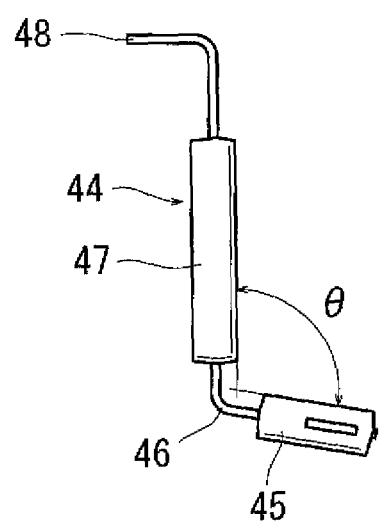
FIG. 16 is a side view of the magneto-electric transducer in a condition in which a lead wire is not sufficiently bent.
Figure 17:
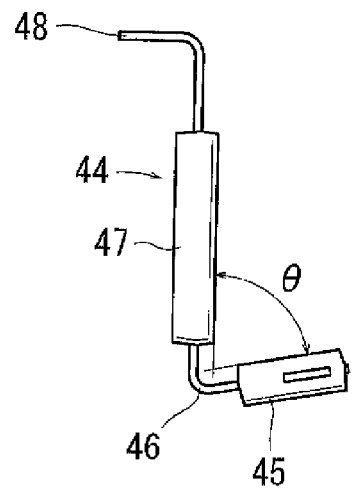
FIG. 17 is a side view of the magneto-electric transducer in a condition in which the lead wire is excessively bent.

As shown in FIG. 16, in some cases, each of the lead wires 46 of the magneto-electric transducers 44 cannot be sufficiently bent. That is, in some cases, each of the lead wires 46 can be bent such that an interior angle between each of the operation voltage output portions 47 and each of the magnetism detection portions 45 is greater than 90 degrees. To the contrary, as shown in FIG. 17, in some cases, each of the lead wires 46 can be excessively bent. That is, in some cases, each of the lead wires 46 can be bent such that the interior angle between each of the operation voltage output portions 47 and each of the magnetism detection portions 45 is smaller than 90 degrees. However, as described above, the magnetism detection portions 45 of the magneto-electric transducers 44 can be elastically pressed against the bottom surface 33a of the receiving recess 33 by the elastic member 60. In addition, the operation voltage output portions 47 of the magneto-electric transducers 44 can respectively be elastically pressed against the wall surfaces 33d and 33e of the receiving recess 33 by the elastic member 60. Therefore, even if the lead wires 46 are not sufficiently bent or excessively bent, when the magneto-electric transducers 44 are disposed in the receiving recess 33, the magnetism detection portions 45 can be reliably pressed against the bottom surface 33a of the receiving recess 33 and at the same time, the operation voltage output portions 47 can respectively be reliably pressed against the wall surfaces 33d and 33e of the receiving recess 33. As a result, detection performance of the magnetism detection portions 45 can be prevented from being reduced. In addition, linearity of the output voltage of the operation voltage output portions 47 can be prevented from being reduced.

Figure 6:
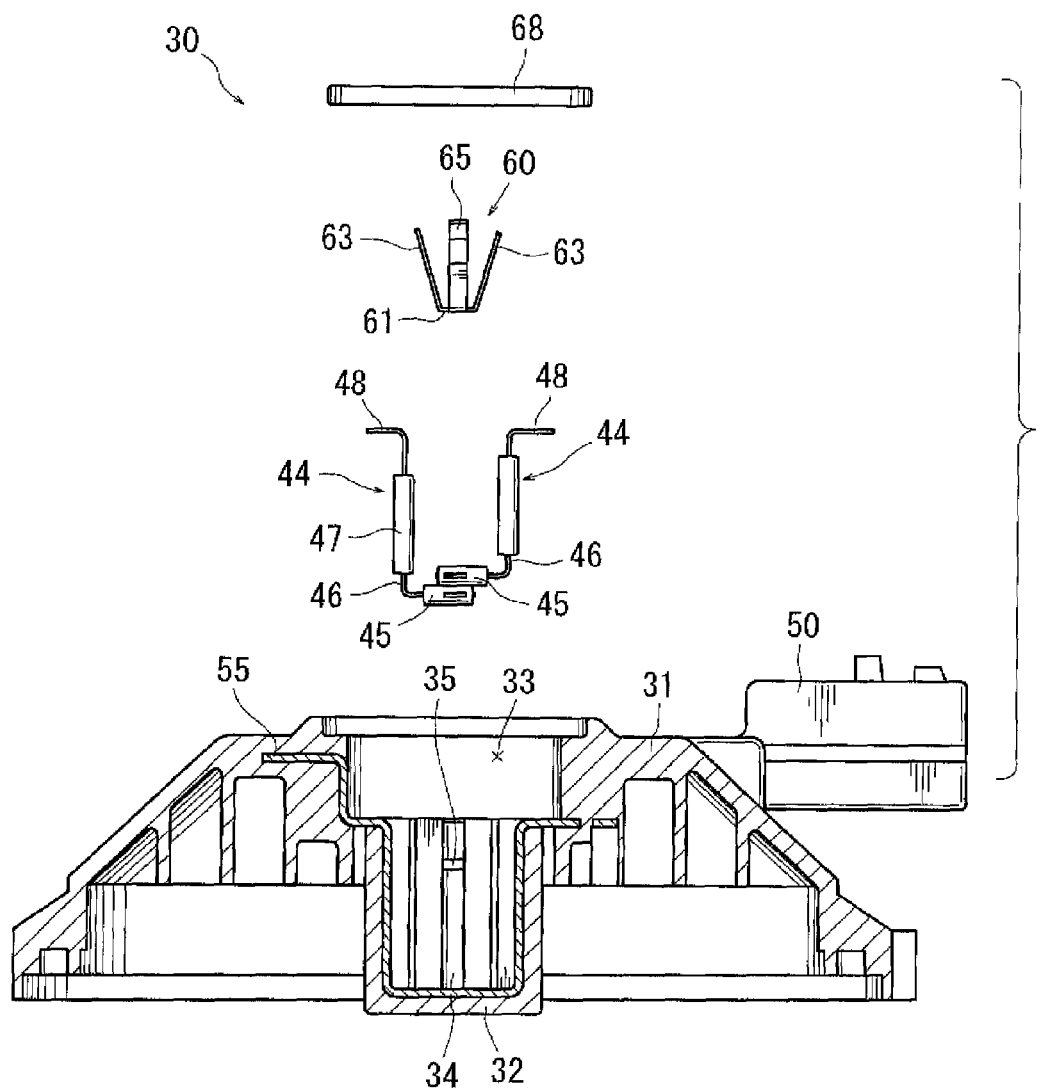
FIG. 6 is a sectional view of the sensor cover, in which construction elements thereof are exploded, which view corresponds to a sectional view taken along line VI-VI of FIG. 7.
Figure 7:
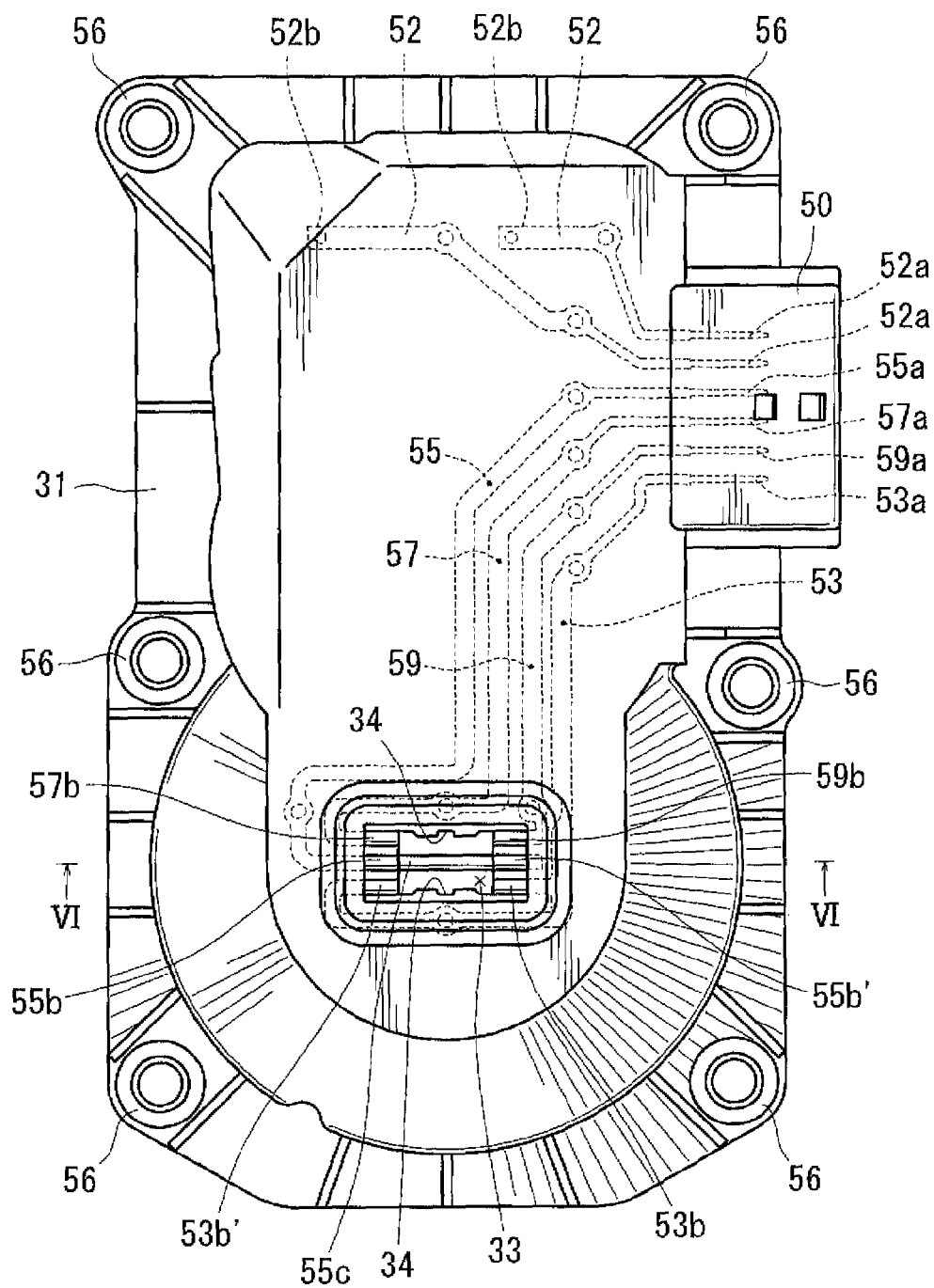
FIG. 7 is a plan view of a cover body of the sensor cover.

Further, as shown in FIG. 6, the magneto-electric transducers 44, the elastic member 60 and the cap 68 can be attached to the cover body 31 from only one direction. Therefore, the magneto-electric transducers 44, the elastic member 60 and the cap 68 can be easily attached to the cover body 31 without turning the cover body 31. This may lead to a simplified assembling process of the sensor cover 30.

According to the throttle valve control device 10 (FIG. 1), the throttle gear 22 is disposed on a side corresponding to the throttle valve 18. Conversely, the sensor cover 30 is disposed on a side corresponding to the throttle body 12. Further, the degree of open of the throttle valve 18 can be detected based on the output signal from each of the magneto-electric transducers 44 (the operation voltage output portions 47) that are disposed in the receiving recess 33 of the sensor cover 30. Thus, the throttle valve control device 10 having the rotation angle detection device in which the magneto-electric transducers 44 is attached to the sensor cover 30 can be provided without performing insert molding.

Second Embodiment

The second detailed representative embodiment will now described with reference to FIG. 18.

Because the second embodiment relates to the first embodiment, only the constructions and elements that are different from the first embodiment will be explained in detail. Elements that are the same in the first and second embodiments will be identified by the same reference numerals and a detailed description of such elements may be omitted.

Figure 18:
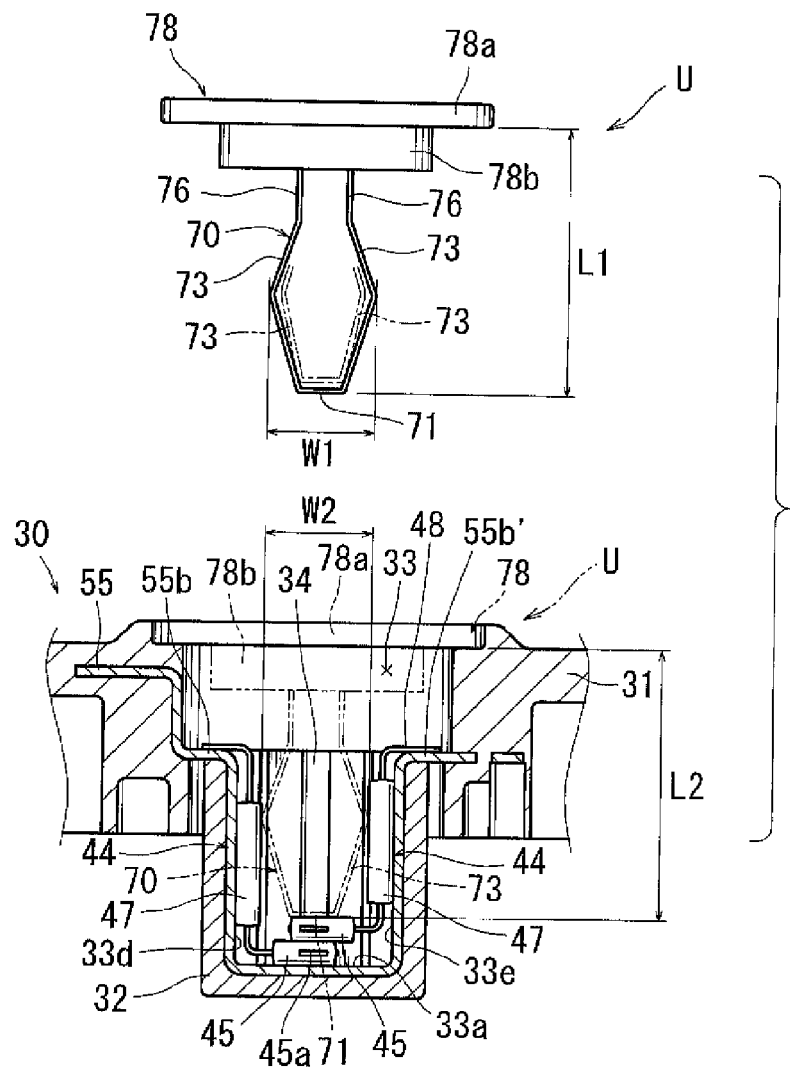
FIG. 18 is a partially cutaway elevational view of a cover body to which a magneto-electric transducer is attached and an elastic member according to a second representative embodiment of the present invention.

As shown in FIG. 18, in this embodiment, an elastic member 70 that is capable of elastically attaching the magneto-electric transducers 44 to the cover body 31 is integrated with a cap 78 that is capable of closing the opening portion of the receiving recess 33 formed in the cover body 31. Further, an integral part of the elastic member 70 and the cap 78 may be referred to as an elastic member/cap assembly U.

The cap 78 may preferably be made of resin. The cap 78 includes a cap body 78a that can be fitted into the upper recess portion (the opening portion) of the receiving recess 33 formed in the cover body 31 and a fitting portion 78b that can be received in the middle recess portion of the receiving recess 33. Further, the cap 78 is secured to the upper recess portion of the receiving recess 33 formed in the cover body 31 by adhesion, welding, thermal crimping or other such methods.

The elastic member 70 may preferably be formed as a press forming product of a nonmagnetic metal plate. The elastic member 70 has a rectangular base portion 71 and a pair of biasing strips 73 that extend upwardly from right and left end portions of the base portion 71. The biasing strips 73 are symmetrically formed and are respectively outwardly oppositely angled or projected. Further, the biasing strips 73 respectively have attaching portions 76 that are formed in upper end portions thereof. The attaching portions 76 vertically extend in parallel with each other. Further, upper end portions of the attaching portions 76 are integrally connected to a lower surface of the fitting portion 78b of the cap 78 by snap-fit engagement, insert engagement, insert molding or other such connecting methods.

As shown by broken lines in FIG. 18, the biasing strips 73 are capable of being elastically deformed such that a distance therebetween can be reduced while heights thereof are reduced. Further, the biasing strips 73 are formed such that a height L1 between a lower surface of the base portion 71 in a normal condition thereof and a lower surface of the cap body 78a of the cap 78 is greater than a height L2 between an annular bottom surface of the upper widened recess portion of the receiving recess 33 and an upper surface of the upper magnetism detection portion 45 of the magneto-electric transducers 44 that are disposed in the receiving recess 33 of the cover body 31. That is, the biasing strips 73 are formed so as to fulfill a relation [L1>L2].

Further, the biasing strips 73 are formed such that a width W1 between outer end portions thereof in the normal condition thereof is greater than a width W2 between the inner surfaces of the operation voltage output portions 47 of the magneto-electric transducers 44 that are disposed in the receiving recess 33 of the cover body 31. That is, the biasing strips 73 are formed so as to fulfill a relation [W1>W2].

The elastic member/cap assembly U is attached to the receiving recess 33 of the cover body 31 in which the magneto-electric transducers 44 are disposed. In particular, the elastic member/cap assembly U is pushed into the receiving recess 33 of the cover body 31 until the lower surface of the base portion 71 contacts the upper surface of the upper magnetism detection portion 45. Thereafter, the elastic member/cap assembly U is further pushed into the receiving recess 33 with the aid of a vertical elastic force of each of the biasing strips 73 until the cap body 78a of the cap 78 is fitted into the opening portion of the receiving recess 33. Subsequently, the cap 78 is secured to the opening portion of the receiving recess 33 by adhesion, welding, thermal crimping or other such methods. Thus, the elastic member/cap assembly U is attached to the receiving recess 33 of the cover body 31.

As a result, the projected outer end portions of the biasing strips 73 respectively elastically contact the inner surfaces of the operation voltage output portions 47. That is, as described above, the biasing strips 73 are formed so as to fulfill a relation [W1>W2]. Therefore, each of the operation voltage output portions 47 can be applied with a biasing or pressing force in a direction (a lateral direction) perpendicular to the axis line 32L of the magnetism detection portions 45 due to an elastic force of each of the biasing strips 73. As a result, the operation voltage output portions 47 can respectively be elastically pressed against the wall surfaces 33d and 33e of the receiving recess 33 by the elastic force of the biasing strips 73. Thus, the operation voltage output portions 47 can respectively be elastically retained on the wall surfaces 33d and 33e of the receiving recess 33 formed in the cover body 31.

Further, as previously described, the biasing strips 73 are formed so as to fulfill the relation [L1>L2]. Therefore, the magnetism detection portions 45 can be applied with a biasing or pressing force in a direction (in a vertical direction) parallel to the axis line 32L of the magnetism detection portions 45 (the receptacle wall portion 32) due to the elastic force of each of the biasing strips 73. As a result, the magnetism detection portions 45 can be elastically pressed against the bottom surface 33a of the receiving recess 33 due to the elastic forces of the biasing strips 73. Thus, the magnetism detection portions 45 can be elastically retained on the bottom surface 33a of the receiving recess 33.

According to the rotation angle detection device of this embodiment, the elastic member 70 and the cap 78 can be used as a unit (i.e., the elastic member/cap assembly U). In addition, according to this embodiment, the engagement notches 35 of the guide grooves 34 in the first embodiment can be omitted.

Third Embodiment

The third detailed representative embodiment will now described with reference to FIG. 19.

Because the third embodiment relates to the second embodiment, only the constructions and elements that are different from the second embodiment will be explained in detail. Elements that are the same in the second and third embodiments will be identified by the same reference numerals and a detailed description of such elements may be omitted.

Figure 19:
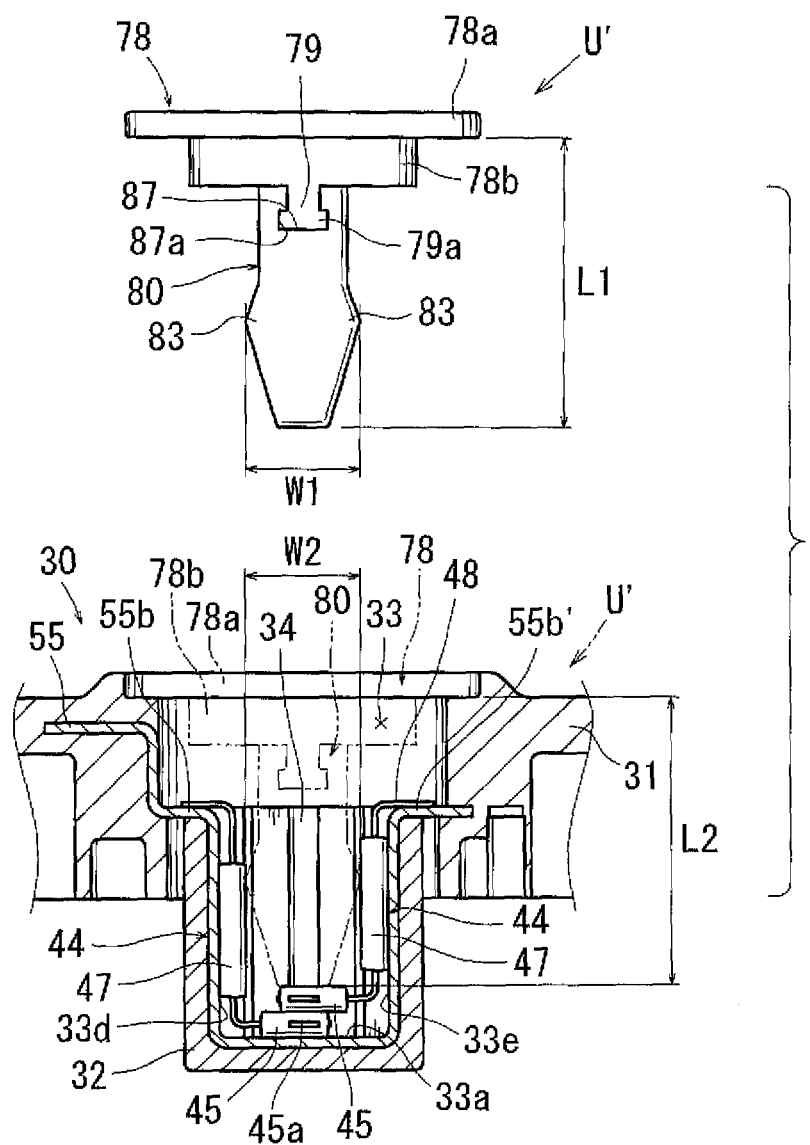
FIG. 19 is a partially cutaway elevational view of a cover body to which a magneto-electric transducer is attached and an elastic member according to a third representative embodiment of the present invention.

As shown in FIG. 19, in this embodiment, an elastic member 80 is used instead of the elastic member 70 in the second embodiment. The elastic member 80 may preferably be formed as a solid member of rubber. The elastic member 80 has the substantially same profile as the elastic member 70 in the second embodiment. The elastic member 80 is symmetrically formed and has outwardly projected portions 83. Further, the elastic member 80 is integrally connected to the cap 78 via a connecting mechanism. In particular, an engagement recess 87 is formed in an upper surface of the elastic member 80. Conversely, an engagement projection 79 is formed in the lower surface of the fitting portion 78b of the cap 78. The elastic member 80 is integrated with the cap 78 by elastically engaging the engagement recess 87 and the engagement projection 79 each other. Further, the engagement projection 79 has an enlarged distal end portion (head portion) 79a. Conversely, the engagement recess 87 has an enlarged bottom portion 87a that is capable of engaging the head portion 79a of the engagement projection 79. As will be appreciated, when the engagement recess 87 engages the engagement projection 79, the head portion 79a and the enlarged bottom portion 87a can engage each other. Thus, the elastic member 80 and the cap 78 can be reliably integrated with each other. Similar to the second embodiment, an integral part of the elastic member 80 and the cap 78 may be referred to as an elastic member/cap assembly U'. Further, instead of the connecting mechanism described above, the elastic member 80 can be integrally connected to the cap 78 by two-color molding, snap-fit engagement, adhesion or other such methods.

Similar to the second embodiment, the elastic member/cap assembly U' is attached to the receiving recess 33 of the cover body 31 in which the magneto-electric transducers 44 are disposed. As a result, the operation voltage output portions 47 can respectively be elastically pressed against the wall surfaces 33d and 33e of the receiving recess 33 by an elastic force of the elastic member 80 (the projected portions 83). Thus, the operation voltage output portions 47 can respectively be elastically retained on the wall surfaces 33d and 33e of the receiving recess 33 formed in the cover body 31. At the same time, the magnetism detection portions 45 can be elastically pressed against the bottom surface 33a of the receiving recess 33 due to the elastic forces of the elastic member 80. Thus, the magnetism detection portions 45 can be elastically retained on the bottom surface 33a of the receiving recess 33.

Fourth Embodiment

The fourth detailed representative embodiment will now described with reference to FIG. 20.

Because the third embodiment relates to the second embodiment, only the constructions and elements that are different from the second embodiment will be explained in detail. Elements that are the same in the second and third embodiments will be identified by the same reference numerals and a detailed description of such elements may be omitted.

Figure 20:
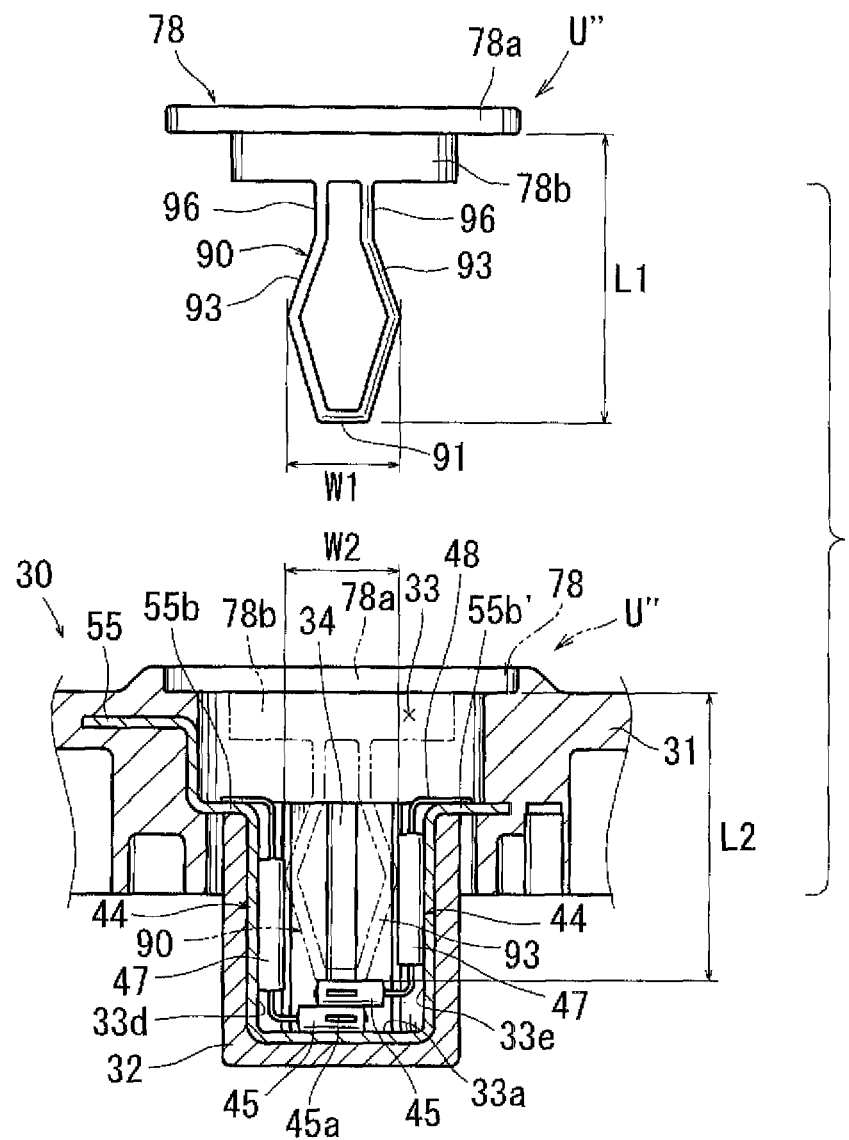
FIG. 20 is a partially cutaway elevational view of a cover body to which a magneto-electric transducer is attached and an elastic member according to a fourth representative embodiment of the present invention.

As shown in FIG. 20, in this embodiment, an elastic member 90 is used instead of the elastic member 70 in the second embodiment. The elastic member 90 has the substantially same structure as the elastic member 70. That is, the elastic member 90 has the substantially same shape as the elastic member 70 and has a rectangular base portion 91, a pair of biasing strips 93 and attaching portions 96 that respectively correspond to the rectangular base portion 71, the biasing strips 73 and the attaching portions 76 of the second embodiment. However, unlike the second embodiment, the elastic member 90 is formed of resin. Further, the elastic member 90 and the cap 78 are integrally formed by molding of resin. Similar to the second embodiment, an integral part of the elastic member 90 and the cap 78 may be referred to as an elastic member/cap assembly U".

Similar to the second embodiment, the elastic member/cap assembly U" is attached to the receiving recess 33 of the cover body 31 in which the magneto-electric transducers 44 are disposed. In this embodiment, similar to the second embodiment, the operation voltage output portions 47 can respectively be elastically retained on the wall surfaces 33d and 33e of the receiving recess 33 of the cover body 31. At the same time, the magnetism detection portions 45 can be elastically retained on the bottom surface 33a of the receiving recess 33.

Fifth Embodiment

The fifth detailed representative embodiment will now described with reference to FIG. 21.

Because the fifth embodiment relates to the first embodiment, only the constructions and elements that are different from the first embodiment will be explained in detail. Elements that are the same in the first and fifth embodiments will be identified by the same reference numerals and a detailed description of such, elements may be omitted.

Figure 21:
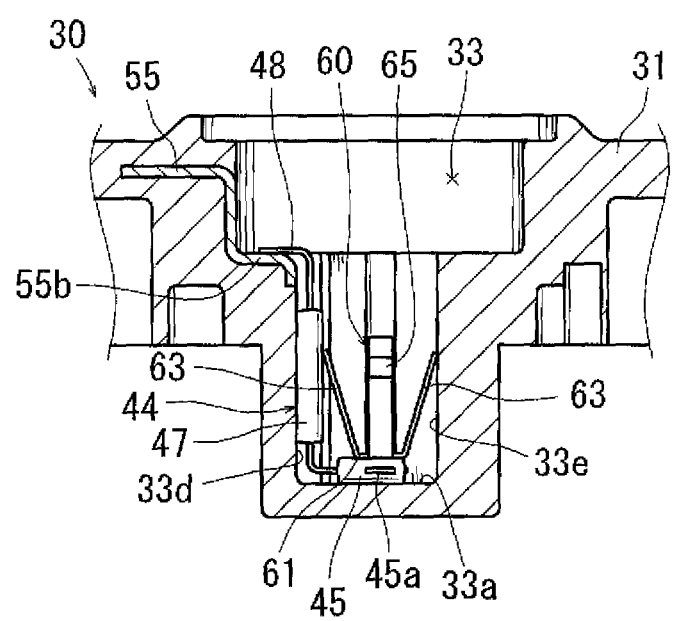
FIG. 21 is a partially sectional view of a sensor cover according to a fifth representative embodiment of the present invention.

As shown in FIG. 21, in this embodiment, the right magneto-electric transducer 44 is omitted. That is, only the left magneto-electric transducer 44 is disposed in the receiving recess 33 of the cover body 31. Therefore, when the elastic member 60 is attached to the receiving recess 33 of the cover body 31, the distal end portion (the outer end portion) of the right first biasing strip 63 of the elastic member 60 is elastically pressed against the right wall surface 33e of the receiving recess 33 by the elastic force of the right first biasing strip 63. Further, because the right magneto-electric transducer 44 is omitted, the terminal portions 53b, 55b' and 59b corresponding to the right magneto-electric transducer 44 can be omitted.

Various changes and modifications may be made to the rotation angle detection device. For example, in the embodiments, the rotation angle detection device capable of detecting the degree of open of the throttle valve 18 used in the throttle valve control device 10 is exemplified. However, the rotation angle detection device can be used to detect a rotation angle of a rotational member that is used in a device other than the throttle valve control device 10.

Further, the electronically-controlled throttle valve control device is exemplified as the throttle valve control device 10. However, a mechanically-controlled throttle valve control device can be used as the throttle valve control device 10.

Further, the sensor IC is exemplified as each of the magneto-electric transducers 44. However, a hall IC can be used as each of the magneto-electric transducers 44.

Further, each of the magneto-electric transducers 44 is constructed to detect the rotation angle of the e throttle gear 22 based on the direction of magnetic field generated between the permanent magnets 41. However, each of the magneto-electric transducers 44 can be constructed to detect the rotation angle of the e throttle gear 22 based on strength of magnetic field generated between the permanent magnets 41.

Representative examples of the present invention have been described in detail with reference to the attached drawings. This detailed description is merely intended to teach a person of skill in the art further details for practicing preferred aspects of the present invention and is not intended to limit the scope of the invention. Only the claims define the scope of the claimed invention. Therefore, combinations of features and steps disclosed in the foregoing detail description may not be necessary to practice the invention in the broadest sense, and are instead taught merely to particularly describe detailed representative examples of the invention. Moreover, the various features taught in this specification may be combined in ways that are not specifically enumerated in order to obtain additional useful embodiments of the present invention.

What is claimed is:

1. A rotation angle detection device, comprising:
   a rotational member; and
   a fixed member having a cover body, at least one magneto-electric transducer and an elastic member;
   wherein the at least one magneto-electric transducer has a magnetism detection portion capable of detecting a change in magnetism caused by rotation of the rotational member and generating a detection signal representative of the change in magnetism, and an operation voltage output portion capable of performing an operation based on the detection signal from the magnetism detection portion and generating an output signal representative of the change in magnetism;
   wherein the cover body has a receptacle wall portion defining a receiving recess that receives the at least one magneto-electric transducer therein;
   wherein the elastic member is attached to the receiving recess in a manner such that the receptacle wall portion is applied with a biasing force in a direction perpendicular to an axis line thereof and in a direction parallel to the axis line, so as to elastically press the magnetism detection portion against a bottom surface of the receiving recess and to elastically press the operation voltage output portion against one of opposite wall surfaces of the receiving recess;
   wherein the receptacle wall portion is opened in an upper surface of the cover body, while a lower half thereof is projected from an inner surface of the cover body; and
   wherein the receiving recess has an engagement notch formed therein.

2. The rotation angle detection device as defined in claim 1, wherein the at least one magneto-electric transducer comprises two magneto-electric transducers,
   wherein the two magneto-electric transducers are oppositely disposed in the receiving recess of the fixed member while the magnetism detection portions are positioned in a stack, and
   wherein the elastic member is capable of elastically pressing the magnetism detection portions of the magneto-electric transducers against the bottom surface of the receiving recess and capable of elastically respectively pressing the operation voltage output portions of the magneto-electric transducers against the opposite wall surfaces of the receiving recess.

3. The rotation angle detection device as defined in claim 1, wherein the elastic member is retained in the receiving recess of the fixed member due to an elastic force of the elastic member.

4. The rotation angle detection device as defined in claim 1 further comprising a cap that is fitted into an opening portion of the receiving recess of the fixed member, wherein the cap is integrally connected to the elastic member.

5. The rotation angle detection device as defined in claim 4, wherein the elastic member is made of metal or rubber, and wherein the cap is made of resin.

6. The rotation angle detection device as defined in claim 4, wherein the elastic member and the cap are made of resin and are integrally formed.

7. A throttle valve control device, comprising:
   a throttle body having an air intake passage formed therein;
   a throttle valve that is received in the air intake passage so as to close and open the air intake passage; and
   a rotation angle detection device that comprises a rotational member, a fixed member having a cover body, at least one magneto-electric transducer, and an elastic member;
   wherein the at least one magneto-electric transducer has a magnetism detection portion capable of detecting a change in magnetism caused by rotation of the rotational member and generating a detection signal representative of the change in magnetism, and an operation voltage output portion capable of performing an operation based on the detection signal from the magnetism detection portion and generating an output signal representative of the change in magnetism;
   wherein the cover body has a receptacle wall portion defining a receiving recess that receives the at least one magneto-electric transducer therein;
   wherein the elastic member is attached to the receiving recess in a manner such that the receptacle wall portion is applied with a biasing force in a direction perpendicular to an axis line thereof, and in a direction parallel to the axis line, so as to elastically press the magnetism detection portion against a bottom surface of the receiving recess and to elastically press the operation voltage output portion against one of opposite wall surfaces of the receiving recess,
   wherein the receptacle wall portion is opened in an upper surface of the cover body while a lower half thereof is projected from an inner surface of the cover body:
   wherein the receiving recess has an engagement notch formed therein;

wherein the rotational member of the rotation angle detection device is disposed on a side corresponding to the throttle valve, wherein the fixed member of the rotation angle detection device is disposed on a side corresponding to the throttle body, and wherein degree of open of the throttle valve is detected based on an output signal from the magneto-electric transducer of the rotation angle detection device.

8. The rotation angle detection device as defined in claim 7, wherein the at least one magneto-electric transducer comprises two magneto- electric transducers, wherein the two magneto-electric transducers are oppositely disposed in the receiving recess of the fixed member while the magnetism detection portions are positioned in a stack, and wherein the elastic member is capable of elastically pressing the magnetism detection portions of the magneto-electric transducers against the bottom surface of the receiving recess and capable of elastically respectively pressing the operation voltage output portions of the magneto-electric transducers against the opposite wall surfaces of the receiving recess.

9. The rotation angle detection device as defined in claim 7, wherein the elastic member is retained in the receiving recess of the fixed member due to an elastic force of the elastic member.

10. The rotation angle detection device as defined in claim 7 further comprising a cap that is fitted into an opening portion of the receiving recess of the fixed member, wherein the cap is integrally connected to the elastic member.

11. The rotation angle detection device as defined in claim 10, wherein the elastic member is made of metal or rubber, and wherein the cap is made of resin.

12. The rotation angle detection device as defined in claim 10, wherein the elastic member and the cap are made of resin and are integrally formed.

* * * * *